United States Patent [19]
Osofsky

[11] 3,749,317
[45] July 31, 1973

[54] THRUST VECTOR CONTROL SYSTEM

[75] Inventor: Irving B. Osofsky, Palos Verdes Peninsula, Calif.

[73] Assignee: McDonnell Douglas Corporation, Santa Monica, Calif.

[22] Filed: Mar. 1, 1971

[21] Appl. No.: 119,747

[52] U.S. Cl. .................. 239/265.19, 239/265.23
[51] Int. Cl. ............................................ B64c 15/10
[58] Field of Search .................. 239/265.19, 265.23

[56] References Cited
UNITED STATES PATENTS
3,302,884  2/1967  Robinson .................. 239/265.23 X
3,266,732  8/1966  Jones ............................ 239/265.23
3,279,185  10/1966  Lewis et al .................... 239/265.23

FOREIGN PATENTS OR APPLICATIONS
1,183,751  12/1964  Germany ....................... 239/265.23

Primary Examiner—M. Henson Wood, Jr.
Assistant Examiner—Reinhold W. Thieme
Attorney—Walter J. Jason, Donald L. Royer and Robert O. Richardson

[57] ABSTRACT

Deflection of a supersonic jet stream engine exhaust by a shock wave resulting from insertion of a small obstruction or a gas stream into the jet stream. This provides flight path deflection of the vehicle powered by the engine.

2 Claims, 6 Drawing Figures

PATENTED JUL 31 1973 3,749,317

INVENTOR.
IRVING B. OSOFSKY
BY Robert O.
Richardson
Attorney.

THRUST VECTOR CONTROL SYSTEM

BACKGROUND OF THE INVENTION

Thrust vector control is a system of deflecting the exhaust gases of a rocket motor as a means of steering the rocket. One system commonly used utilizes a movable nozzle which is tilted by means of servo controlled hydraulic or mechanical struts to obtain a thrust vector deflection. This system has relatively slow response due to inertia of the nozzle and clearance must be given the moving nozzle within the vehicle. It is also expensive and heavy. Another way of changing the direction of a supersonic gaseous jet is to introduce an obstruction into its jet stream. This may be a mechanical object or a gas or fluid. Compressed gas accumulates upstream of the place of insertion and creates a detached shock wave in the supersonic gas that may deflect the entire stream through a considerable angle. This is especially true of high performance rocket engines. This means of deflecting a jet has many advantages over other methods of changing the direction of a rocket because of its compactness and light weight. In one such presently available thrust vector control system, valves are used to inject a fluid or gas into the rocket nozzle, forming an obstruction to deflect the exhaust flow. These systems are heavy and expensive due to the complexity but they do have a quick reaction except when under acceleration, the mass of the valve parts make operation sluggish.

SUMMARY OF THE PRESENT INVENTION

The present invention relates to a simple method of deflecting the thrust vector of a rocket operating in a high acceleration force environment on the order of 350 to 375 G acceleration. The whole rocket burn time is no longer than 1 second and there must be no greater than a 1 millisecond response time in initiating the deflection in order that the rocket may negotiate a 75° turn within 200 milliseconds. The simplified system herein set forth injects small pins or individual gas jets into the nozzle to obtain flow deflection. In one form, a plurality of vane-shaped explosive actuated pins are positioned about the nozzle and selected pins are moved into the exhaust flow for guidance and roll control. The explosive actuators provide these shaped pins with a fast response. They have a good storage life and are insensitive to high accelerations. In another form, a large number of small gas generators are placed around the nozzle and selected ones are activated to provide the thrust vector change. Vanes may be provided within the nozzle with the gas generators on both sides for roll control.

DETAILED DESCRIPTION OF ILLUSTRATIVE EMBODIMENTS

Figures 1, 2:
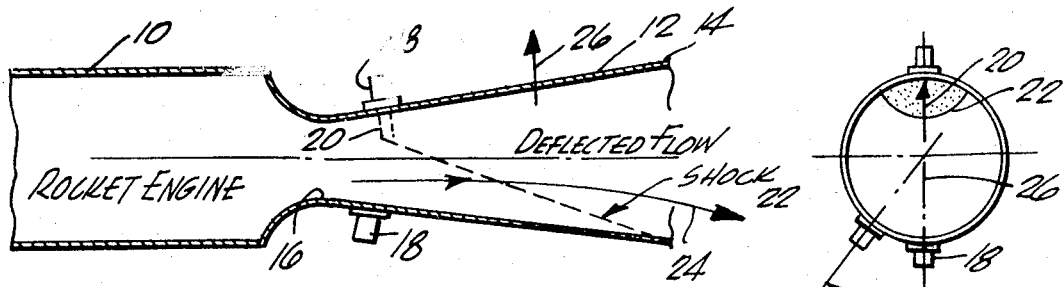
FIG. 1 is a schematic representation of the thrust vector control system.
FIG. 2 is a sectional view of the nozzle showing the circumferential placement of the deflection pins.

Referring now to FIG. 1 there is shown the aft portion of a rocket engine 10 terminating in a thrust nozzle 12, the outer end 14 of which the rocket engine exhaust exits. A restrictive throat 16 accelerates the flow of exhaust gases to generate a propulsive thrust, all in a manner well-known in the rocket engine art. At some point between the throat 16 and the exit 14 of the nozzle 12, a plurality of obstruction devices 18 are placed. A plurality of these devices are spaced about the periphery as shown in FIG. 2 in order that selected ones may be actuated as desired. When such device is actuated, as shown by the dotted lines 20 protruding into the nozzle, it causes a deflected shock wave shown by line 22. This, in turn, deflects the exhaust flow such as is shown by the arcuate arrow 24. The rocket nozzle thrust deflection is in the direction of arrow 26. The projection 20 may be a solid pin made of metal, ceramic, composite or plastic and may be explosively, mechanically or electrically inserted into the nozzle. The penetration and deflection may also be by insertion of a gas or liquid as will be described hereinafter.

Figures 3, 6:
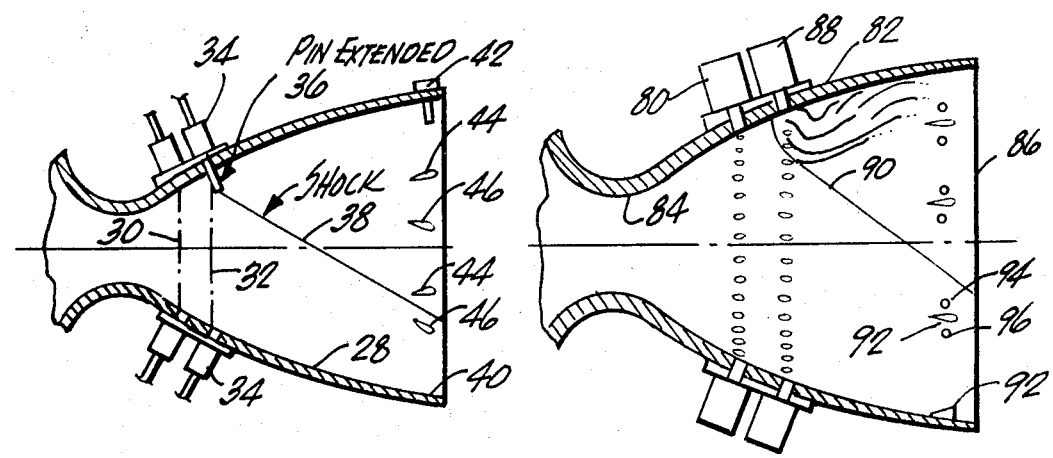
FIG. 3 is a schematic sectional view illustrating a deflection pin extending into the nozzle and its effect upon the shock wave in the exhaust.
FIG. 6 is a schematic sectional view showing a plurality of gas generators about the periphery and the effect of activation of one generator.

In FIG. 3 there is shown a rocket engine nozzle 28 having a plurality of rows 30, 32 of restrictive devices 34 about the periphery of the nozzle. In a manner similar to the schematic illustration of FIG. 1, one of the devices has been actuated so that a pin 36 extends into the nozzle and creates a shock wave 38. With time, the pin 36 melts, oxidizes or erodes away and the nozzle disturbance is reduced to zero. The disturbance, of course, depends upon the pin height and diameter and the number of pins extended.

Near the end 40 of the nozzle 28 are more actuating devices 42 spaced about the periphery. These actuate vane-shaped pins for roll stabilization. For example, the actuation of pins 44 would impart a clockwise rotation, looking from the nozzle toward the rocket tip, and the insertion of pins 46 into the nozzle would impart a counter-rotation. Selected ones of each, when inserted, would cause non-rotation.

Figures 4, 5:
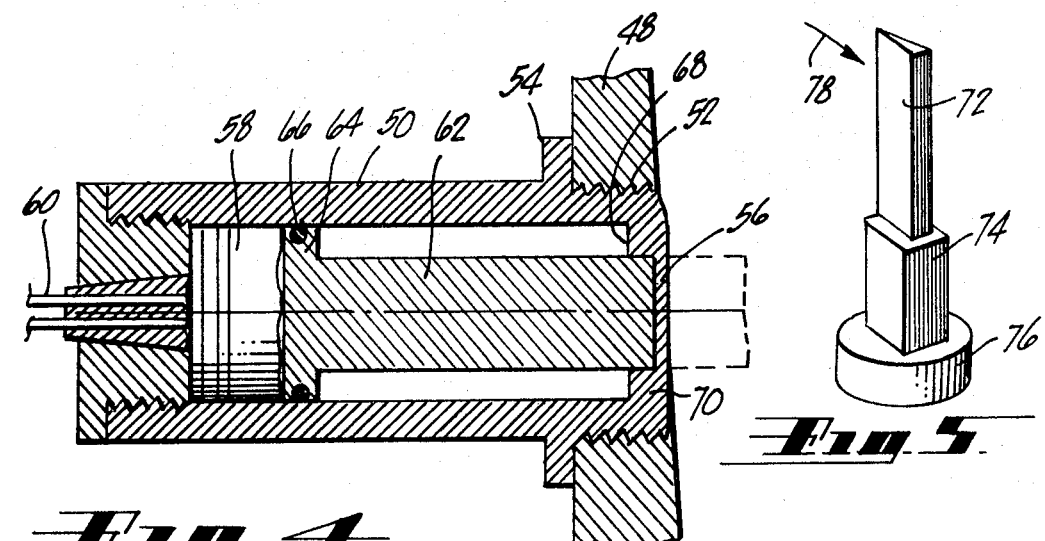
FIG. 4 is a sectional view of a typical explosive actuated pin pusher.
FIG. 5 is a perspective view of a vane-shaped pin that may be placed within the nozzle for roll stabilization.

FIG. 4 is a sectional view of an explosive pin pusher. Here there is shown a nozzle wall 48 into which the cylinder 50 of the explosive device is threadedly engaged by means of cooperating threads 52. A collar 54 fits against the exterior surface of the wall 48 for firmness in making the connection. Cylinder 50 has a thin frangible cover 56 that becomes part of the inner nozzle wall until ruptured. Within the cylinder 50 is an explosive squib 58 that may be electrically detonated by means of electrical wiring 60. Within the cylinder 50 there is a pin 62 adapted to rupture the frangible cover 56 upon detonation. Pin 62 has a piston collar 64 and appropriate O-rings 66 to prevent the escapement of the explosive gases when squib 58 is detonated. Collar 64 abuts against the inner surface 68 of the end 70 of the cylinder 50 in order to limit the outward movement in pin 62. Pin 62 may be round for use in thrust deflection or of a vane-shape for use in roll stabilization.

In FIG. 5 a vane-shaped pin 72 extends from a non-rotatable piston 74 which has a piston head 76 adapted to be actuated within an actuating cylinder such as that shown in FIG. 4. Pin 72 is preferably mounted with the thin edge of its blade portion generally facing the direction of thrust shown by arrow 78.

FIG. 6 is a sectional view of a gas thrust deflection system. This differs from the conventional system having one supply source with a plurality of valved nozzles spaced about the periphery of the nozzle. Since acceleration forces in the environment of use of the present invention are too great to use moving parts in valves, the single supply source with multiple valves is not a satisfactory arrangement. As shown in FIG. 6 a plurality of unitized, self-contained gas generators 80 are positioned about the periphery of the nozzle 82 between the throat 84 and the exit 86. Selected ones through appropriate sensors, computers and circuitry, not shown, may be activated to release gases into the jet stream. Gas generator 88 is shown generating shock wave 90 to cause an upward deflection of the nozzle exit 86.

The roll stabilization system for the nozzle in FIG. 6 consists of a plurality of fixed axial vanes 92 spaced about the exit 86. On either side of each vane is a gas generator port 94, 96 either of which may be selected to handle the roll stabilization problem it was designed to correct.

Having thus described illustrative embodiments of this invention, it is to be understood that other variations are possible and that these deviations from the embodiments just described are to be considered as part of the present invention.

I claim:

1. A thrust vector control system for a rocket engine having an exhaust nozzle including a throat and an exit end, said system comprising:

a plurality of shock wave generators spaced about the periphery of said nozzle, each of said generators adapted to insert into the exhaust stream within said nozzle a means for generating a shock wave for deflecting the thrust of said exhaust to thus exert a lateral force on said nozzle, said shock wave generators being explosive actuated cylinders having inwardly directed pistons therein, deflection pins driven by said pistons for penetration through the walls of said nozzle and into the jet exhaust stream through said nozzle, said deflection pins being vane-shaped and angularly directed near said exit to provide for roll stabilization of said rocket engine.

2. A thrust vector control system for a rocket engine having an exhaust nozzle including a throat and an exit end, said system comprising:

a plurality of individual unitized, self-contained shock wave gas generators spaced about the periphery of said nozzle for generating gases from selected generators into said exhaust stream, a plurality of fixed vanes positioned near said nozzle exit, said generators being mounted on each side of said vanes whereby selected ones of said generators may be energized to effect desired roll control of said rocket engine.

* * * * *